US009747690B2

(12) United States Patent
Uemori

(10) Patent No.: US 9,747,690 B2
(45) Date of Patent: *Aug. 29, 2017

(54) IMAGE PROCESSING DEVICE, IMAGE PROCESSING METHOD, AND PROGRAM

(71) Applicant: Sony Corporation, Tokyo (JP)

(72) Inventor: Takeshi Uemori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,073

(22) Filed: Aug. 26, 2016

(65) Prior Publication Data

US 2016/0364865 A1 Dec. 15, 2016

Related U.S. Application Data

(63) Continuation of application No. 14/594,430, filed on Jan. 12, 2015, now Pat. No. 9,449,389.

(30) Foreign Application Priority Data

Feb. 3, 2014 (JP) .................................. 2014-018743

(51) Int. Cl.
| | |
|---|---|
| G06K 9/00 | (2006.01) |
| G06T 7/00 | (2017.01) |
| G06T 7/30 | (2017.01) |
| G06T 7/593 | (2017.01) |
| G06T 7/254 | (2017.01) |

(52) U.S. Cl.
CPC .......... *G06T 7/0024* (2013.01); *G06T 7/254* (2017.01); *G06T 7/30* (2017.01); *G06T 7/593* (2017.01); *G06T 2207/10012* (2013.01); *G06T 2207/10024* (2013.01); *G06T 2207/20228* (2013.01)

(58) Field of Classification Search
CPC ......... G06T 7/0024; G06T 2207/10012; G06T 2207/10021; G06T 2207/20228; G06T 7/593; G06T 7/254; H04N 2013/0081
USPC .......................................................... 382/154
See application file for complete search history.

(56) References Cited

U.S. PATENT DOCUMENTS

| | | | |
|---|---|---|---|
| 8,422,766 B2 | 4/2013 | Zhang | |
| 8,989,481 B2 * | 3/2015 | Hsu ....................... | G06T 7/0075 382/154 |
| 9,082,176 B2 | 7/2015 | Baik | |
| 9,336,596 B2 * | 5/2016 | Ferguson ................ | G06T 5/004 |

(Continued)

FOREIGN PATENT DOCUMENTS

| | | |
|---|---|---|
| JP | 2011-55421 | 3/2011 |
| JP | 2012-65851 | 4/2012 |
| JP | 2012-178688 | 9/2012 |

*Primary Examiner* — Daniel Mariam
(74) *Attorney, Agent, or Firm* — Oblon, McClelland, Maier & Neustadt, L.L.P.

(57) ABSTRACT

There is provided an image processing device including a matching degree calculation unit configured to calculate a matching degree between a pixel value of a target pixel in a standard image of a current frame and a pixel value of a corresponding pixel in a reference image of the current frame, and an estimation unit configured to estimate a disparity between the standard image and the reference image based on a result obtained by calculating the matching degree. The matching degree calculation unit calculates the matching degree using a disparity estimated for the standard image and the reference image of a previous frame.

10 Claims, 14 Drawing Sheets

(56) References Cited

U.S. PATENT DOCUMENTS

2012/0098932 A1 4/2012 Kim
2012/0162364 A1 6/2012 Ferguson
2012/0262543 A1 10/2012 Lee

* cited by examiner

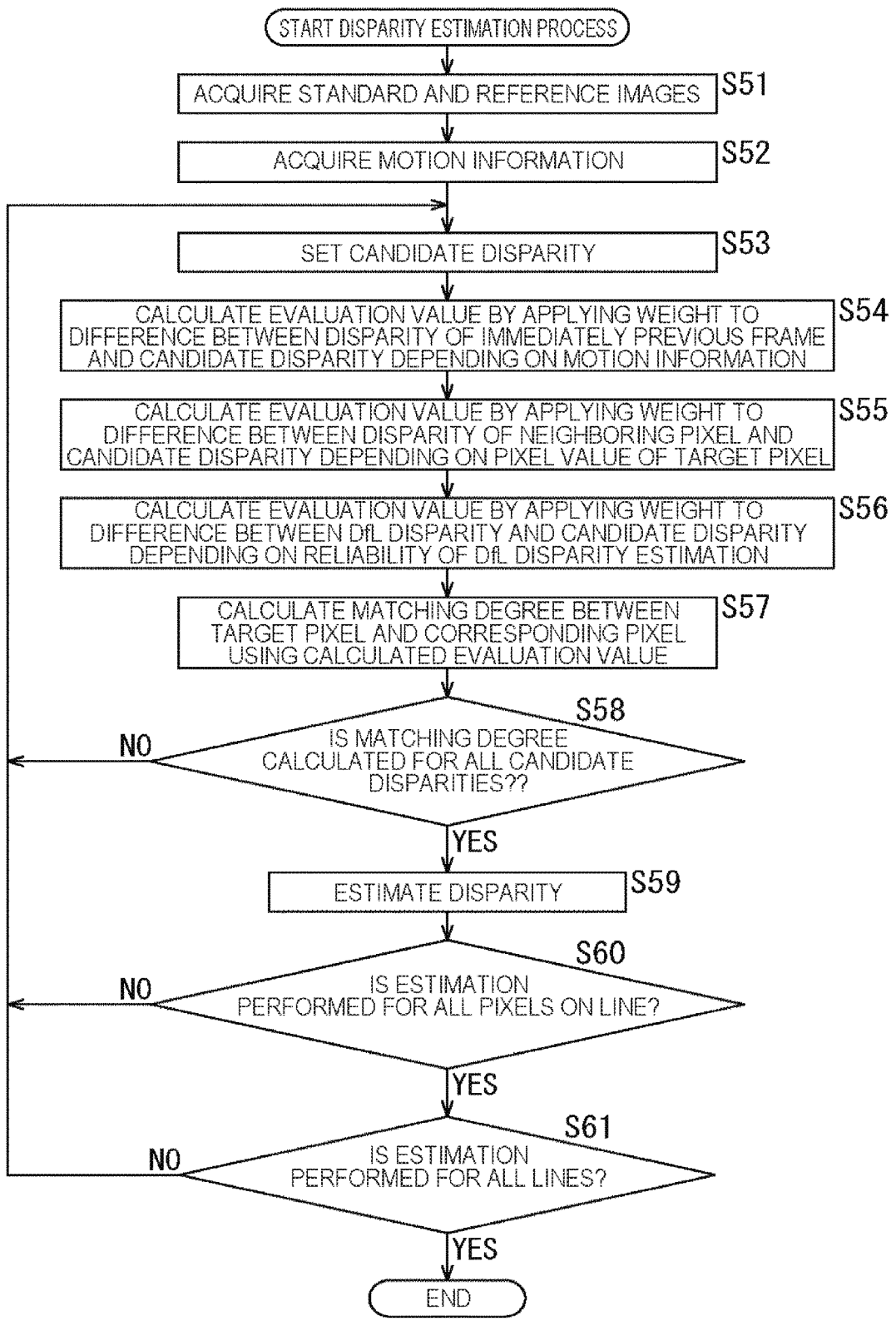

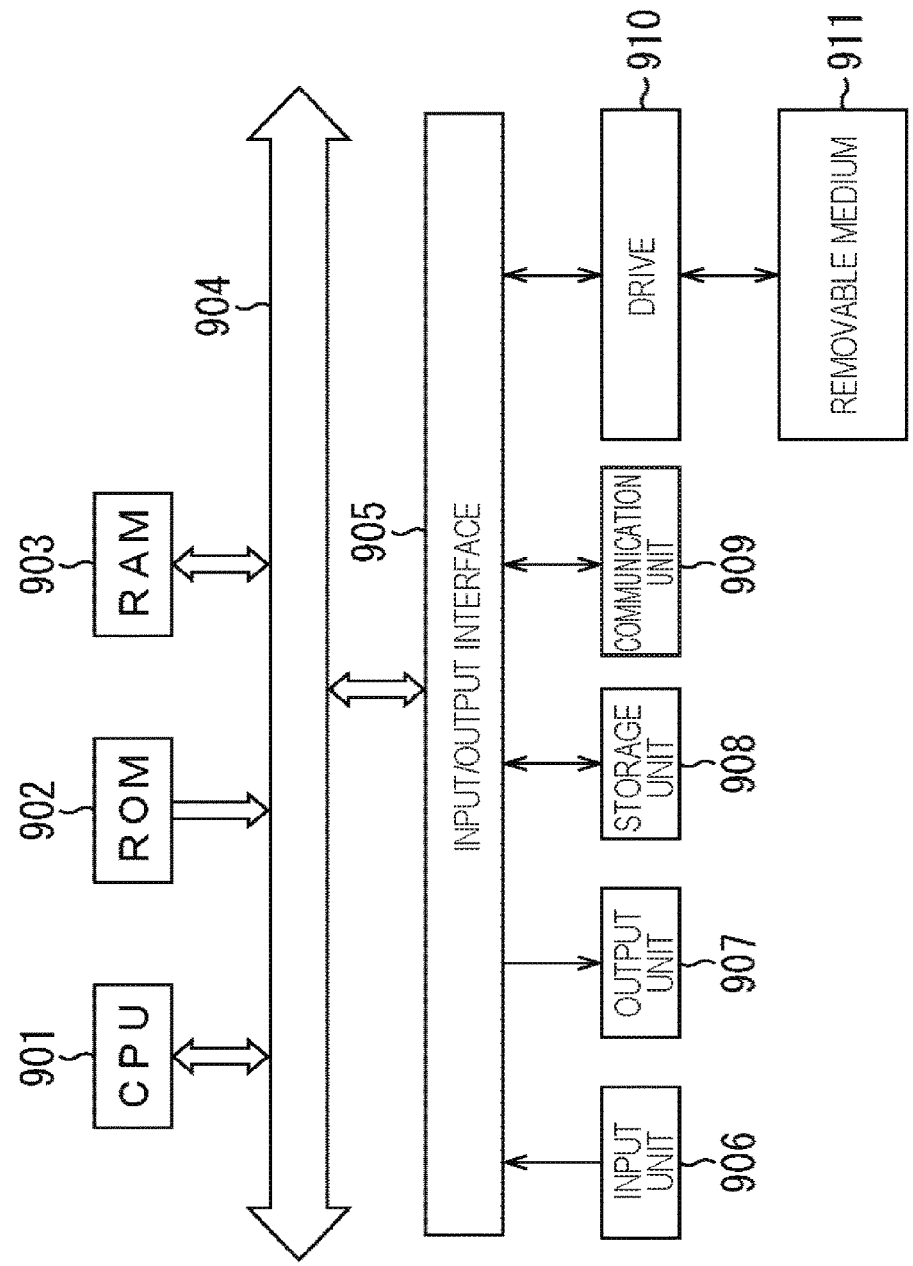

IMAGE PROCESSING DEVICE, IMAGE PROCESSING METHOD, AND PROGRAM

CROSS REFERENCE TO RELATED APPLICATIONS

This application is a continuation of U.S. patent application Ser. No. 14/594,430, Jan. 12, 2015, which claims the benefit of Japanese Priority Patent Application JP 2014-018743 filed Feb. 3, 2014. The entire contents of these applications are incorporated herein by reference.

BACKGROUND

The present technology relates generally to an image processing device, an image processing method, and a program. More particularly, the present technology relates to an image processing device, an image processing method, and a program, capable of estimating a disparity in a more reliable manner.

A plurality of captured images having different viewpoints have been used to obtain three-dimensional information in real space for displaying stereoscopic images. As an example, a technique for estimating disparity as three-dimensional information based on images captured from left-eye and right-eye viewpoints is known (for example, refer to JP 2012-065851A).

Furthermore, when a stereoscopic image is displayed, for example, a technique is known to compare a disparity between left-eye and right-eye view images at time t−1 with a disparity between left-eye and right-eye view images at time t, and then, if the change rate of disparity is higher than a given value, to adjust the disparity at the time t (for example, refer to JP 2011-055421A and JP 2012-178688A). This makes it possible to prevent abrupt variation in the depth direction of an object in a stereoscopic image, resulting in a reduction of the discomfort and fatigue of the user.

SUMMARY

The above-mentioned JP 2012-065851A obtains reliable results of disparity estimation in the spatial direction, but it has no description on reliable results of disparity estimation in the time direction. Thus, reliable results of disparity estimation for captured images may not be obtained when the captured image has various types of noise.

To solve this, a low-pass filtering process is performed in time series for results obtained by estimating disparity for each frame, and thus reliable results of disparity estimation in the time direction are obtained.

However, if a result obtained by disparity estimation for a certain frame is erroneous, the low-pass filtering process is performed based on the erroneous result and thus the incorrect result will be provided.

The present technology is made in view of such circumstances, and it is intended to be able to estimate disparity in a more reliable manner.

According to an embodiment of the present disclosure, there is provided an image processing device including a matching degree calculation unit configured to calculate a matching degree between a pixel value of a target pixel in a standard image of a current frame and a pixel value of a corresponding pixel in a reference image of the current frame, and an estimation unit configured to estimate a disparity between the standard image and the reference image based on a result obtained by calculating the matching degree. The matching degree calculation unit calculates the matching degree using a disparity estimated for the standard image and the reference image of a previous frame.

It is possible to further provide a temporal evaluation value calculation unit configured to calculate a temporal evaluation value used to evaluate a temporal variation in a disparity based on a difference between the disparity for the previous frame and the disparity estimated for the standard image and the reference image of the current frame, and the matching degree calculation unit may calculate the matching degree using the temporal evaluation value.

The temporal evaluation value calculation unit may apply a weight to the temporal evaluation value depending on a movement in the standard image or the reference image.

The temporal evaluation value calculation unit may set the weight to be applied to the temporal evaluation value to be larger as a movement in the standard image or the reference image becomes smaller.

The matching degree calculation unit may calculate the matching degree, using a pixel value of a pixel of a target region including the target pixel in the standard image of the current frame and a pixel value of a pixel of a corresponding region including the corresponding pixel in the reference image of the current frame.

It is possible to further provide a spatial evaluation value calculation unit configured to calculate a spatial evaluation value used to evaluate a spatial variation in a disparity based on a difference between a disparity estimated for a neighboring pixel located near the target pixel and a disparity estimated for the target pixel, and the matching degree calculation unit may calculate the matching degree using the temporal evaluation value and the spatial evaluation value.

The spatial evaluation value calculation unit may apply a weight to the spatial evaluation value depending on a pixel value of the target pixel.

It is possible to further provide a luminance-to-disparity conversion unit configured to convert luminance to a disparity based on a luminance value and a disparity for the previous frame, the luminance being a luminance value of a textureless region in the standard image of the current frame, and a luminance-disparity evaluation value calculation unit configured to calculate a luminance-disparity evaluation value used to evaluate a disparity converted from luminance based on a difference between the disparity converted from luminance of the standard image and the disparity estimated for the standard image of the current frame, and the matching degree calculation unit may calculate the matching degree using the temporal evaluation value and the luminance-disparity evaluation value.

The luminance-disparity evaluation value calculation unit may apply a weight to the luminance-disparity evaluation value depending on reliability of luminance-to-disparity conversion performed by the luminance-to-disparity conversion unit.

The luminance-disparity evaluation value calculation unit may set the weight to be applied to the luminance-disparity evaluation value to be larger as the reliability of luminance-to-disparity conversion performed by the luminance-to-disparity conversion unit becomes higher.

According to another embodiment of the present disclosure, there is provided an image processing method including calculating a matching degree between a pixel value of a target pixel in a standard image of a current frame and a pixel value of a corresponding pixel in a reference image of the current frame, and estimating a disparity between the standard image and the reference image based on a result obtained by calculating the matching degree. The matching degree is calculated, in the matching degree calculating step, using a disparity estimated for the standard image and the reference image of a previous frame.

According to another embodiment of the present disclosure, there is provided a program for causing a computer to execute processing of calculating a matching degree between a pixel value of a target pixel in a standard image of a current frame and a pixel value of a corresponding pixel in a reference image of a current frame, and estimating a disparity between the standard image and the reference image based on a result obtained by calculating the matching degree. The matching degree is calculated, in the matching degree calculating step, using a disparity estimated for the standard image and the reference image of a previous frame.

In an embodiment of the present technology, a matching degree between a pixel value of a target pixel in a standard image of a current frame and a pixel value of a corresponding pixel in a reference image of the current frame is calculated, and a disparity between the standard image and the reference image based on a result obtained by calculating the matching degree is estimated. In particular, the matching degree is calculated using a disparity estimated for a standard image and a reference image of a previous frame.

According to one or more embodiments of the present technology, it is possible to estimate disparity in a more reliable manner.

BRIEF DESCRIPTION OF THE DRAWINGS

FIG. 13 is a flowchart illustrated to describe a disparity estimation process; and FIG. 14 is a block diagram illustrating an exemplary hardware configuration of a computer.

DETAILED DESCRIPTION OF THE EMBODIMENT(S)

Figure 1:
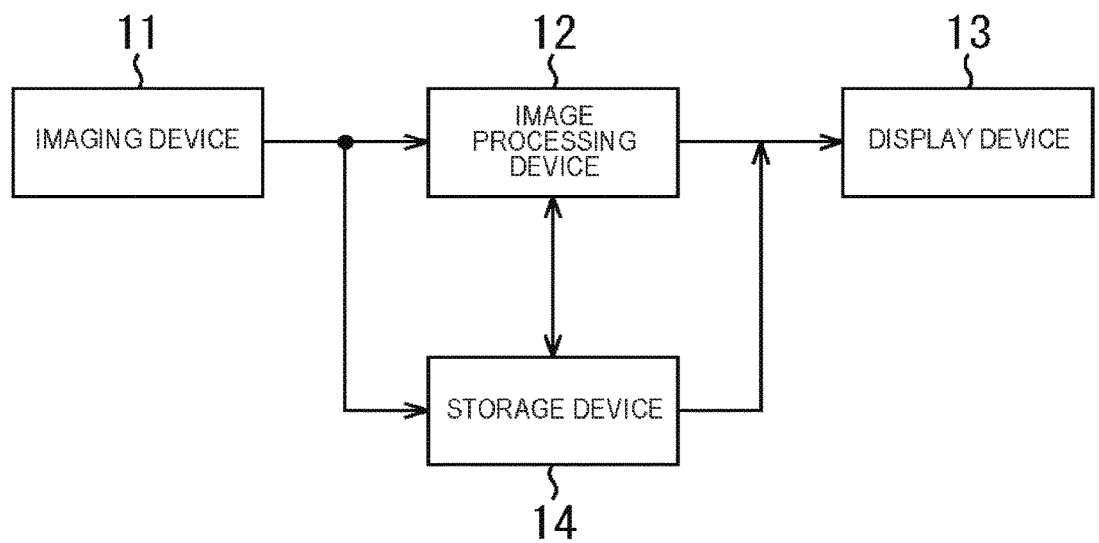
FIG. 1 is a block diagram illustrating an exemplary configuration of a system including an image processing device according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present technology are described below with reference to the drawings. The description is made in the following order.

1. Configuration of image processing system
2. Principle of disparity estimation
3. Configuration of image processing device known in related art
4. Configuration of image processing device according to embodiment of present technology
5. Operation of image processing device
6. Other configurations and operations of image processing device <1. Configuration of Image Processing System>

FIG. 1 illustrates an exemplary configuration of an image processing system including an image processing device according to an embodiment of the present technology.

The image processing system shown in FIG. 1 is configured to include an imaging device 11, an image processing device 12, a display device 13, and a storage device 14. As shown in FIG. 1, the image processing device 12 is connected to the imaging device 11, the display device 13, and the storage device 14.

The imaging device 11 generates a plurality of images captured from different viewpoint positions and supplies the images to the image processing device 12 or the storage device 14. For example, the imaging device 11 generates an image captured from a left-eye viewpoint position (hereinafter, referred to as "left image") and an image captured from a right-eye viewpoint position (hereinafter, referred to as "right image"), and supplies the images to the image processing device 12 or the storage device 14.

The image processing device 12 estimates a disparity from a plurality of images captured from different viewpoint positions generated by the imaging device 11 or from a plurality of images captured from different viewpoint positions stored in the storage device 14. The image processing device 12 then supplies a result obtained by disparity estimation to the display device 13 or the storage device 14.

For example, the image processing device 12 performs disparity estimation by using left and right images which are generated by the imaging device 11 or stored in the storage device 14. The image processing device 12, when performing disparity estimation using an image stored in the storage device 14, supplies a result obtained by the disparity estimation to the storage device 14 so that the storage device 14 may store the result in association with an image stored therein.

The display device 13 displays a stereoscopic image based on the image generated by the imaging device 11 or stored in the storage device 14 and the result of disparity estimation obtained by the image processing device 12.

The display device 14 stores a plurality of images captured from different viewpoint positions generated by the image device 11 or stores the result of disparity estimation obtained by the image processing device 12.

Figure 2:
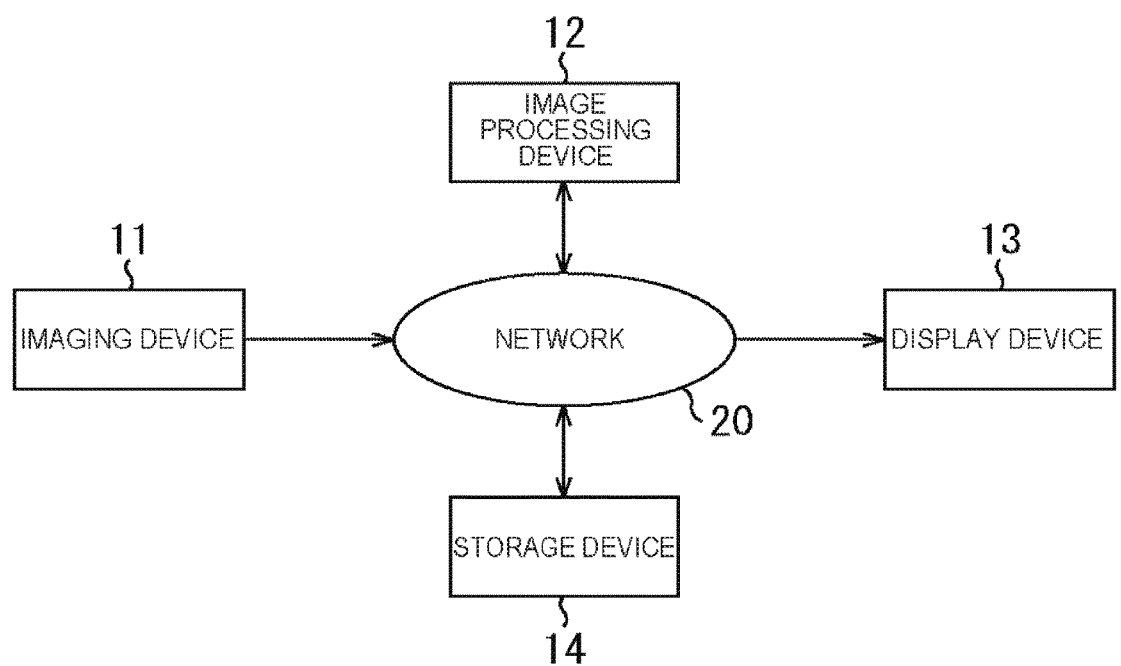
FIG. 2 is a block diagram illustrating another exemplary configuration of the system including the image processing device according to an embodiment of the present technology.

The image processing system may be configured so that the image processing device 12 is connected to the imaging device 11, the display device 13, and the storage device 14 through a network 20 via a wired or wireless connection as shown in FIG. 2. The image processing system also may be configured so that the image processing device 12 is incorporated into any one of the imaging device 11, the display device 13, and the storage device 14.

<2. Principle of Disparity Estimation>

The principle of disparity estimation according to an embodiment of the present technology is now described with reference to FIG. 3.

Figure 3:
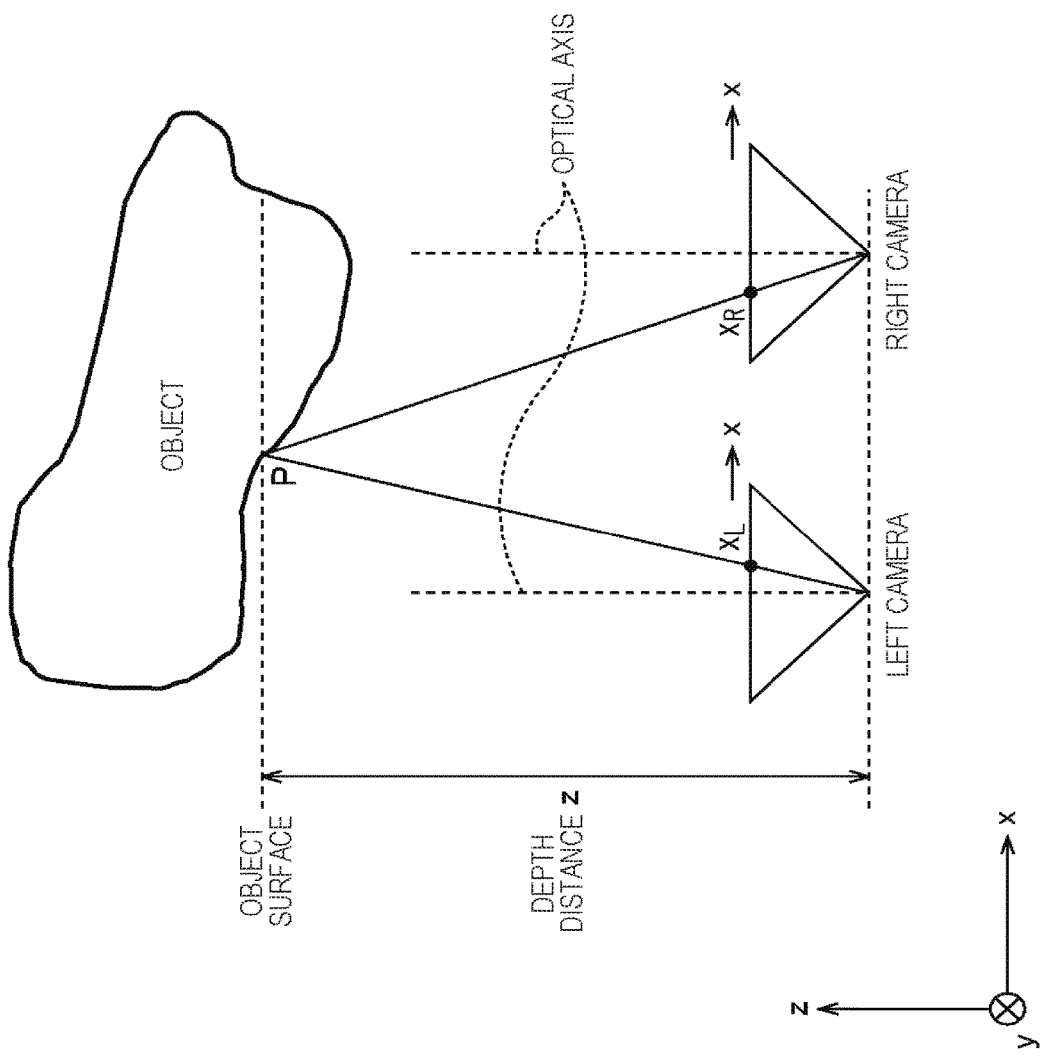
FIG. 3 is a diagram illustrated to describe the principle of disparity estimation.

An embodiment of the present technology estimates disparity between a left image L and a right image R captured respectively by two cameras (left and right cameras) as shown in FIG. 3.

In FIG. 3, optical axes of the left and right cameras are assumed to be parallel to each other. In addition, it is assumed that, when a point P on the surface of an object in the three-dimensional space is projected onto an image sensor of each of the left and right cameras to obtain an image, each position of the left and right cameras is corrected physically or each of the left and right images L and R is corrected electronically so that displacement in the vertical direction (y-axis direction) between the left image L and the right image R at the point P is equal to zero.

Thus, in each of the left and right images, the point P is located on the same line (the same y-coordinate) and is deviated only in the horizontal direction (x-axis direction). When a corresponding point (pixel) on the left image L corresponding to the point P has coordinates $(x_L, y)$ and a corresponding point on the right image R corresponding to the point P has coordinates $(x_R, y)$, the amount of deviation $|x_L - x_R|$ in the horizontal direction (x-axis direction) is a disparity D.

In general, estimating a disparity is equivalent to calculating the absolute value of difference between pixel values of the left image L and the right image R and obtaining a corresponding point, and this process is called stereo matching.

Specifically, the disparity estimation calculates a matching degree between pixel values of the left image L and the right image R, which is expressed as an evaluation formula E indicating the absolute value of the difference between the pixel value $I_L(x_L, y)$ of the left image L and the pixel value $I_R(x_R, y)$ of the right image R as given in the following Equation (1), where the left image L is a standard image and the right image R is a reference image.

$$E = |I_L(x_L, y) - I_R(x_L - d, y)| \quad (1)$$

In Equation (1), a pixel $(x_L - d, y)$ on the right image R in which the evaluation formula E has the minimum value is searched by changing a disparity d to be a candidate (hereinafter, referred to as "candidate disparity d") in a fixed range on the basis of a pixel (xL,y) on the left image L, thereby obtaining a corresponding point. In other words, a candidate disparity d in which the evaluation formula E has the minimum value is the finally obtained disparity D, as given in the following Equation (2).

$$D = \mathop{\mathrm{argmin}}_{d}(E) \quad (2)$$

The configuration of an image processing device known in related art which performs disparity estimation using the above-described method will be described.

<3. Configuration of Image Processing Device Known in Related Art>

Figure 4:
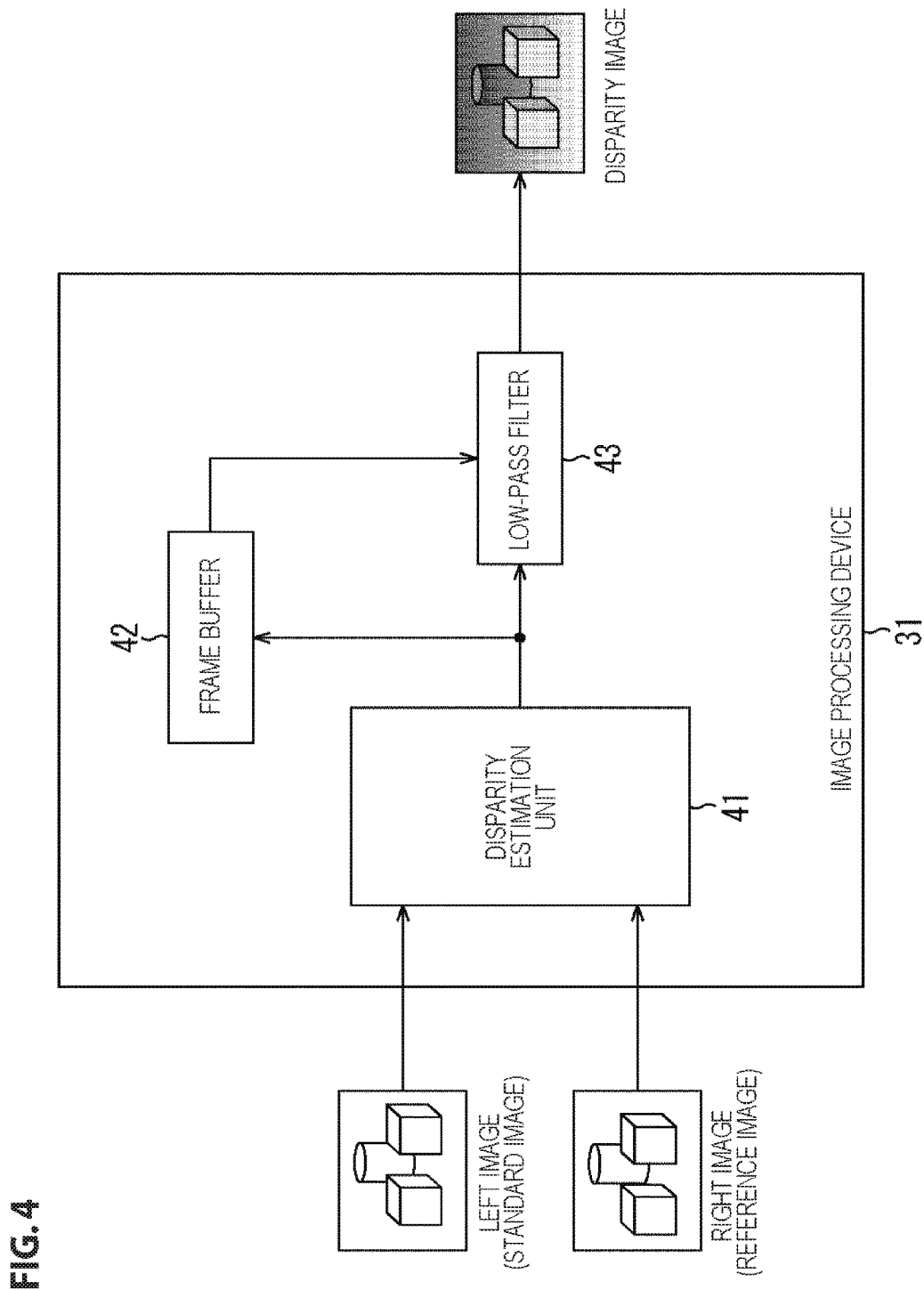
FIG. 4 is a block diagram illustrating an exemplary configuration of an image processing device known in related art.

FIG. 4 is a block diagram illustrating an exemplary configuration of an image processing device known in related art which performs disparity estimation.

An image processing device 31 is configured to include a disparity estimation unit 41, a frame buffer 42, and a low-pass filter 43.

The disparity estimation unit 41 performs disparity estimation for a left image and a right image of the current frame inputted to the image processing device 31 using the left image as a standard image and the right image as a reference image. The disparity estimation unit 41 then supplies a disparity image obtained as a result by the disparity estimation to the frame buffer 42 and the low-pass filter 43.

The disparity image is an image having the disparity obtained for each of the corresponding points of the left and right images (hereinafter, referred also to as "disparity value") as a pixel value of each pixel of the disparity image. As the distance from a subject to a camera becomes larger, the disparity value decreases. As the distance from a subject to a camera becomes smaller, the disparity value increases.

The frame buffer 42 stores a disparity image, which is supplied from the disparity estimation unit 41, for one frame.

The low-pass filter 43 performs a low-pass filtering process on the disparity image of the current frame supplied from the disparity estimation unit 41 using a disparity image of the immediately previous frame stored in the frame buffer 42. The disparity image subjected to the low-pass filtering process is outputted as a final disparity image for the current frame.

This configuration makes it possible to obtain a reliable result of the disparity estimation in the time direction.

Figure 5:
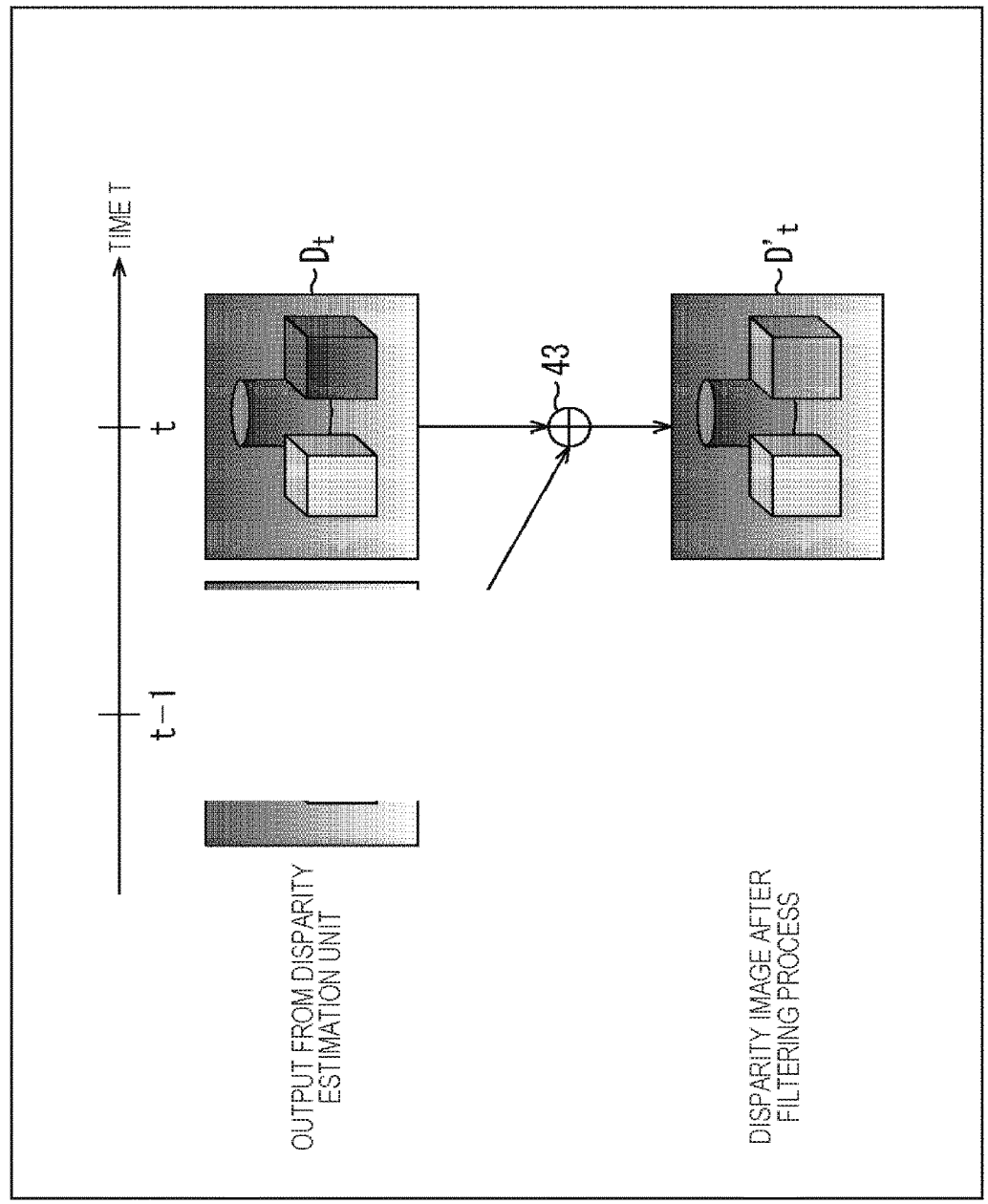
FIG. 5 is a diagram illustrated to describe the disparity estimation performed by the image processing device known in related art.

FIG. 5 is a diagram illustrated to describe disparity estimation performed by the image processing device 31 shown in FIG. 4.

As shown in the upper portion of FIG. 5, two images $D_{t-1}$ and $D_t$ indicate disparity images outputted from the disparity estimation unit 41 at time t−1 and time t, respectively. In FIG. 5, the shades of color of the disparity images are representative of the magnitude of disparity values. As color becomes darker, the disparity value decreases (a subject is located away from a camera). As color becomes lighter, the disparity value increases (a subject is located near a camera).

In the example shown in FIG. 5, it is assumed that, among the subjects, two cubes are located near a camera, a column is located away from a camera, and the positional relationship between the camera and the objects is not changed during the interval from time t−1 to time t.

It is assumed that the disparity estimation unit 41 is unable to estimate properly a disparity value of a cube at the right side in the disparity image $D_t$ in the time t due to noise or other factors, as the right-side cube is represented by the darker color although it is located nearer to a camera. The disparity images $D_{t-1}$ and $D_t$ are weighted and added together by the low-pass filter 43, and even in the disparity image $D_t'$ shown in the lower portion of FIG. 5, which is subjected to the low-pass filtering process, the right-side cube is represented by the darker color although it is located nearer to a camera, and thus an erroneous result of disparity estimation will be obtained. The disparity image $D_t'$ is used for disparity estimation at time t+1, and thus an erroneous result of disparity estimation at time t will be provided.

The configuration of the image processing device that performs the disparity estimation to be robust against the effect of noise or the like is described below.

<4. Configuration of Image Processing Device According to Embodiment of Present Technology>

Figure 6:
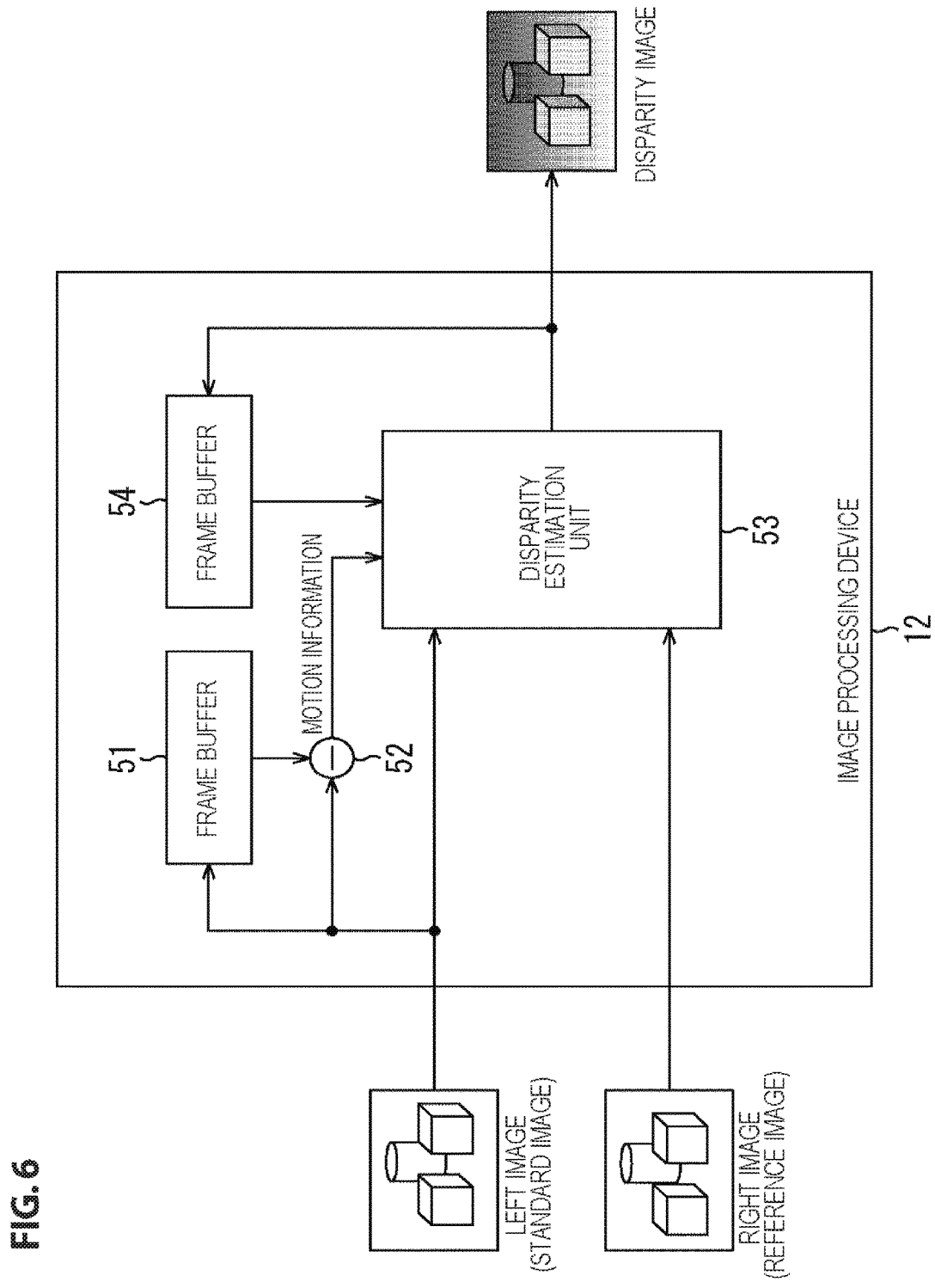
FIG. 6 is a block diagram illustrating an exemplary functional configuration of the image processing device according to an embodiment of the present technology.

FIG. 6 is a block diagram illustrating an exemplary configuration of the image processing device according to an embodiment of the present technology.

As shown in FIG. 6, the image processing device 12 is configured to include a frame buffer 51, a motion detection unit 52, a disparity estimation unit 53, and a frame buffer 54.

The following description is made using a left image and a right image as a standard image and a reference image, respectively, among images inputted to the image processing device 12, but the left image and the right image may be used as a reference image and a standard image, respectively.

The frame buffer 51 stores a left image (standard image), which is inputted to the image processing device 12, for one frame.

The motion detection unit 52 detects movement of a subject in a left image (standard image) and a right image (reference image) inputted to the image processing device 12 and supplies motion information indicating the detected movement to the disparity estimation unit 53. For example, the motion detection unit 52 obtains the difference between frames using a standard image of the current frame and a standard image of the immediately previous frame stored in the frame buffer 51 to detect the movement of a subject. The movement of a subject may be detected by obtaining the difference between frames using a reference image of the current frame and a reference image of the immediately previous frame.

The disparity estimation unit 53 performs disparity estimation on a standard image and a reference image inputted to the image processing device 12 for each frame, supplies a disparity image obtained as a result of the disparity estimation to the frame buffer 54, and then outputs the disparity image to other devices connected to the image processing device 12. Specifically, the disparity estimation unit 53 performs disparity estimation using the motion information supplied from the motion detection unit 52 and the disparity image of the immediately previous frame stored in the frame buffer 54, and detailed description thereof will be described later with reference to FIG. 7.

The frame buffer 54 stores the disparity image, which is supplied from the disparity estimation unit 53, for one frame.

An exemplary configuration of the disparity estimation unit 53 is now described in more detail with reference to FIG. 7.

Figure 7:
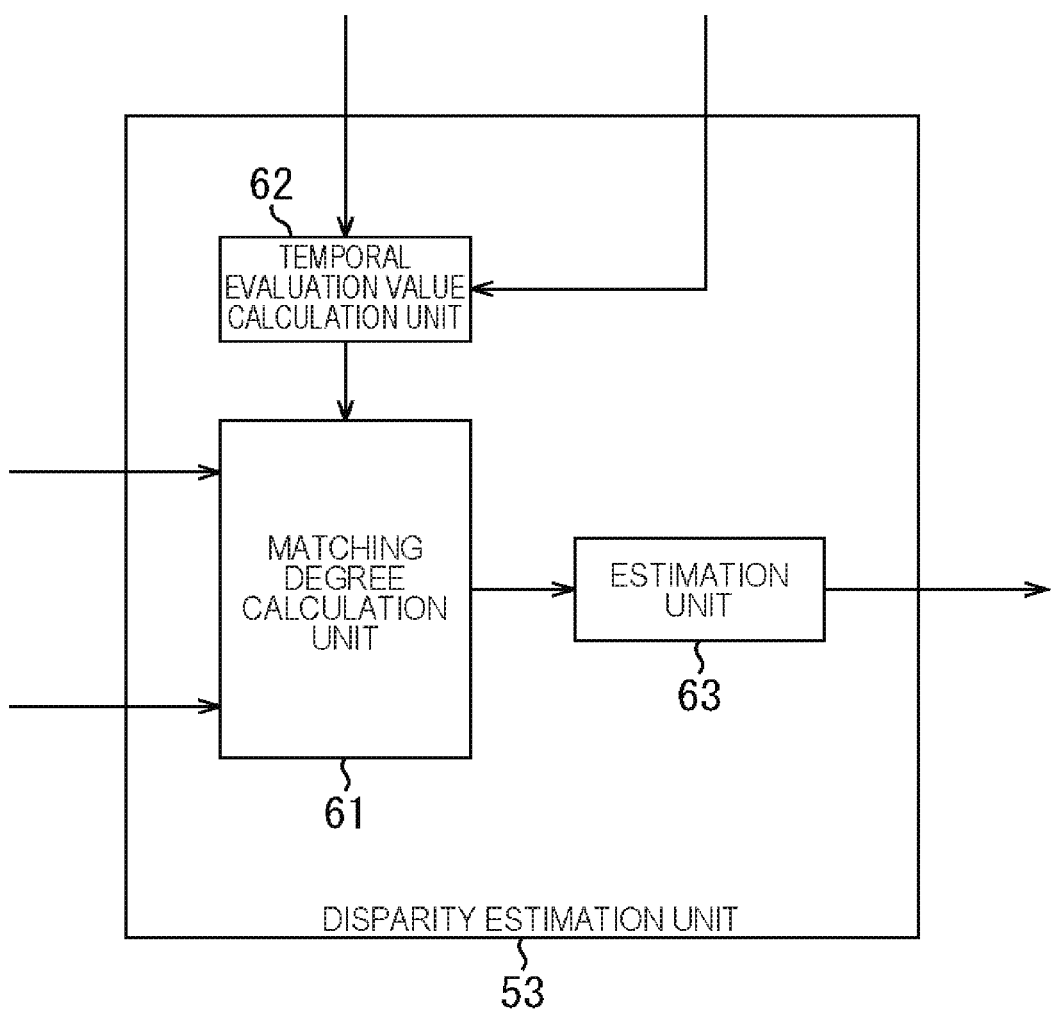
FIG. 7 is a block diagram illustrating an exemplary functional configuration of a disparity estimation unit.

As shown in FIG. 7, the disparity estimation unit 53 is configured to include a matching degree calculation unit 61, a temporal evaluation value calculation unit 62, and an estimation unit 63.

The matching degree calculation unit 61 calculates a matching degree indicating a degree of match between pixel values (specifically, luminance value) of a target pixel to be a target in a standard image of the current frame and a corresponding pixel to be corresponded to the target pixel in a reference image of the current frame. The calculation of the matching degree is performed using a temporal evaluation value supplied from a temporal evaluation value calculation unit 62, which is described later. The matching degree calculation unit 61 then supplies the calculated matching degree to the estimation unit 63.

The temporal evaluation value calculation unit 62 calculates a temporal evaluation value used to evaluate a temporal variation in disparity using the motion information supplied from the motion detection unit 52 and a disparity value corresponding to the target pixel in the disparity image of the immediately previous frame supplied from the frame buffer 54. The temporal evaluation value calculation unit 62 then supplies the calculated temporal evaluation value to the matching degree calculation unit 61.

The estimation unit 63 estimates a disparity of the standard image and the reference image for each pixel based on a result obtained by calculating the matching degree by the matching degree unit 61 and outputs a disparity image including a disparity value obtained for each pixel.

The operation of the image processing device 12 having the above-described configuration to perform disparity estimation is now described.

<5. Operation of Image Processing Device>

Figure 8:
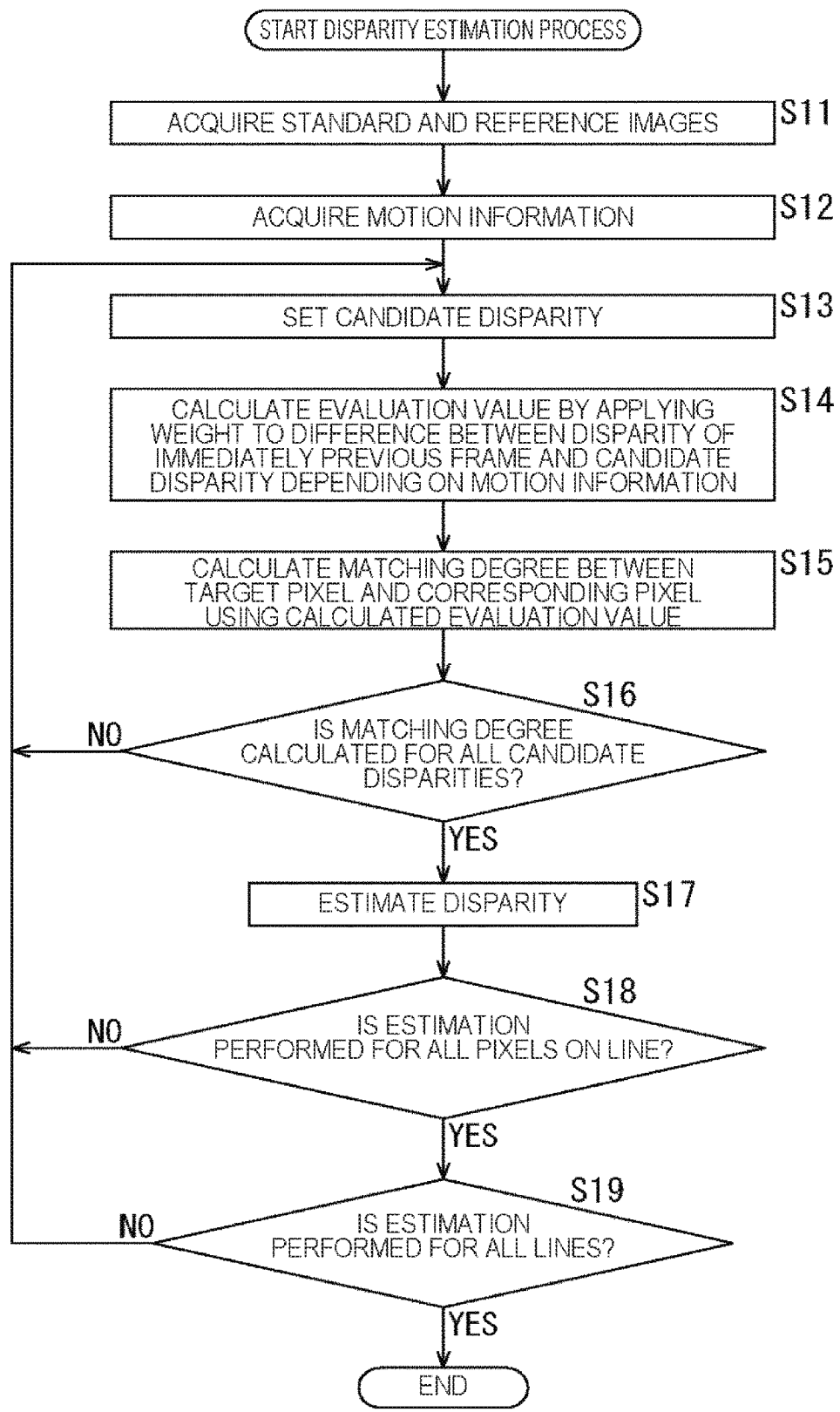
FIG. 8 is a flowchart illustrated to describe a disparity estimation process.

FIG. 8 is a flowchart illustrated to describe a disparity estimation process performed by the image processing device 12 described above. The disparity estimation process illustrated in FIG. 8 is a process performed for a given single frame, and the disparity estimation process is performed every time a left image and a right image are supplied for each frame from the imaging device 11 or the storage device 14.

In step S11, the disparity estimation unit 53 acquires a left image (standard image) and a right image (reference image) inputted to the image processing device 12.

In step S12, the disparity estimation unit 53 acquires motion information supplied from the motion detection unit 52. This motion information indicates movement of a subject in the standard image and the reference image.

In the following description, the process is performed by assuming that a predetermined pixel on a given line in a standard image of the current frame is set as a target pixel.

In step S13, the disparity estimation unit 53 sets a candidate disparity d used to search a corresponding pixel in the reference image on the basis of the target pixel in the standard image. The candidate disparity d is set to be changed within a fixed range as described above.

In step S14, the temporal evaluation value calculation unit 62 applies a weight to a disparity value $D_{previous}$ and a value $|D_{previous}-d|$ by a weighting factor $\lambda_{temporal}$ depending on the motion information supplied from the motion detection unit 52 and thus calculates a temporal evaluation value $\lambda_{temporal}|D_{previous}-d|$. The disparity value $D_{previous}$ is a value corresponding to a target pixel in a disparity image of the immediately previous frame. The value $|D_{previous}-d|$ is the absolute value of the difference between the disparity value and the candidate disparity d.

The absolute value $|D_{previous}-d|$ is a value that represents the continuity of disparity in the time direction. When the change in positional relationship between a camera and an object as a subject is small, the absolute value $|D_{previous}-d|$ is small. On the other hand, when the change in positional relationship between a camera and an object as a subject is large, the value $|D_{previous}-d|$ large.

The temporal evaluation value calculation unit 62 controls dynamically the weighting factor $\lambda_{temporal}$ by analyzing whether the positional relationship between a camera and an object as a subject is actually changed based on the motion information supplied from the motion detection unit 52.

In other words, if it is determined that there is no movement between the immediately previous frame and the current frame and a positional relationship between the camera and the object as a subject has little variation based on the motion information supplied from the motion detection unit 52, the temporal evaluation value calculation unit 62 increases the weighting factor $\lambda_{temporal}$, resulting in an increase in the temporal evaluation value $\lambda_{temporal}|D_{previous}-d|$.

On the other hand, if it is determined that there is any movement between the immediately previous frame and the current frame and a positional relationship between the camera and the object as a subject has a variation based on the motion information supplied from the motion detection unit 52, the temporal evaluation value calculation unit 62 decreases the weighting factor $\lambda_{temporal}$, resulting in a decrease in the temporal evaluation value $\lambda_{temporal}|D_{previous}-d|$.

Then, in step S15, the matching degree calculation unit 61 calculates a matching degree between a luminance value of a target pixel in the standard image and a luminance value of a corresponding pixel in the reference image using the temporal evaluation value that is calculated by the temporal evaluation value calculation unit 62.

Specifically, the matching degree calculation unit 61 sets the sum of the temporal evaluation value $\lambda_{temporal}|D_{previous}-d|$ and the absolute value (hereinafter, referred also to as "stereo matching term") of the difference between a pixel value $I_L(x_L,y)$ of the target pixel on the left image L and a pixel value $I_R(x_L-d,y)$ of a corresponding pixel on the right image R as an evaluation formula E, as shown in the following Equation (3), and then calculates the matching degree between luminance values of the target pixel in the standard image and the corresponding pixel in the reference image.

$$E=|I_L(x_L,y)-I_R(x_L-d,y)|+\lambda_{temporal}|D_{previous}-d| \qquad (3)$$

As described above, when there is no movement between the immediately previous frame and the current frame, the term of the temporal evaluation value $\lambda_{temporal}|D_{previous}-d|$ in Equation (3) is large, and thus the effect on the evaluation formula E increases. As a result, it is possible to reduce variation in the results obtained by the disparity estimation in the time direction. On the other hand, when there is any movement between the immediately previous frame and the current frame, the term of the temporal evaluation value $\lambda_{temporal}|D_{previous}-d|$ in Equation (3) is small, and thus the effect on the evaluation formula E decreases. As a result, the results obtained by the disparity estimation in the time direction are allowed to be varied.

In step S16, the matching degree calculation unit 61 determines whether the matching degree is calculated for all the candidate disparities d that varies within a fixed range.

In step S16, if it is not determined that the matching degree is calculated for all the candidate disparities d, then the process returns to step S13 and the subsequent process is repeated.

On the other hand, in step S16, if it is determined that the matching degree is calculated for all the candidate disparities d, then the process proceeds to step S17. In step S17, the estimation unit 63 estimates a disparity D from among the candidate disparities d by applying the above Equation (2) to the evaluation formula E that is calculated for each candidate disparity d by the matching degree calculation unit 61.

In this way, a disparity value for one target pixel is obtained.

After step S17, in step S18, the disparity estimation unit 53 determines whether a disparity is estimated for all the pixels on the line.

In step S18, if it is not determined that the disparity is estimated for all the pixels on the line, the process returns to step S13 and the subsequent process is performed on the remaining pixels on the line.

On the other hand, in step S18, if it is determined that the disparity is estimated for all the pixels on the line, the process proceeds to step S19. In step S19, the disparity estimation unit 53 determines whether the disparity is estimated for all the lines.

In step S19, if it is not determined that the disparity is estimated for all the lines, then the process returns to step S13 and the subsequent process is performed on other lines.

On the other hand, in step S19, if it is determined that the disparity is estimated for all the lines, then the disparity estimation unit 53 outputs a disparity image for one frame and then the disparity estimation process for one frame is completed.

According to the above-described process, the continuity of disparity in the time direction is considered using a temporal evaluation value in calculating the matching degree between corresponding points of the left and right images, and thus even when the disparity estimation for a given frame produces an erroneous result, it is possible to estimate the disparity in a more reliable manner without producing erroneous results.

In particular, the weighting factor for the temporal evaluation value may be controlled dynamically based on motion information, and thus it is possible to obtain a more reliable result of the disparity estimation in the time direction with respect to a stationary object as well as a moving object.

An image contains various types of noise, and thus the calculation of the matching degree by comparing pixels in the standard and reference images to each other is susceptible to noise, as shown by the stereo matching term of Equation (1) or (3). Accordingly, the matching degree may be calculated by comparing pixels in a given region of the standard and reference images.

Specifically, the matching degree calculation unit 61 sets the sum of the sum total of the absolute value of the difference between pixel values of pixels of a region (target region) containing the target pixel on the left image L and a region (corresponding region) containing the corresponding pixel on the right image R and the temporal evaluation value $\lambda_{temporal}|D_{previous}-d|$ as an evaluation formula E, as shown in the following Equation (4), and then calculates the matching degree between a luminance value of the target pixel in the standard image and a luminance value of the corresponding pixel in the reference image.

$$E = \sum_n \sum_m (|I_L(x_L+m, y+n) - I_R(x_L+m-d, y+n)|) + \qquad (4)$$
$$\lambda_{temporal}|D_{previous}-d|$$

In Equation (4), a first term on the right side is the stereo matching term that is used to compare a luminance value of a pixel of the standard image and a luminance value of a pixel of the reference image in a region of $(2M-1)\times(2N-1)$ (where, M and N are positive values) on the basis of the target pixel in the standard image. In Equation (4), m and n are values that satisfy $-M \leq m \leq M$ and $-N \leq n \leq N$, respectively.

As described above, the matching degree is calculated by comparing a pixel in a region of the standard image to a pixel in a region of the reference image, and thus it is possible to reduce the effect of noise, as compared to the case in which the matching degree is calculated by simply comparing a pixel of the standard image to a pixel of the reference image.

In the above description, the weighting factor $\lambda_{temporal}$ is controlled dynamically based on the motion information, but for example, the weighting factor $\lambda_{temporal}$ may be controlled dynamically by determining whether a subject is a moving object using object recognition, or the weighting factor $\lambda_{temporal}$ may be controlled dynamically by determining whether a subject is a moving object using color discrimination.

The image processing device according to an embodiment of the present technology may be configured to perform disparity estimation that is more robust against the effect of noise or the like.

<6. Other Configurations and Operations of Image Processing Device> (Reliable Disparity Estimation in Spatial Direction)

Figure 9:
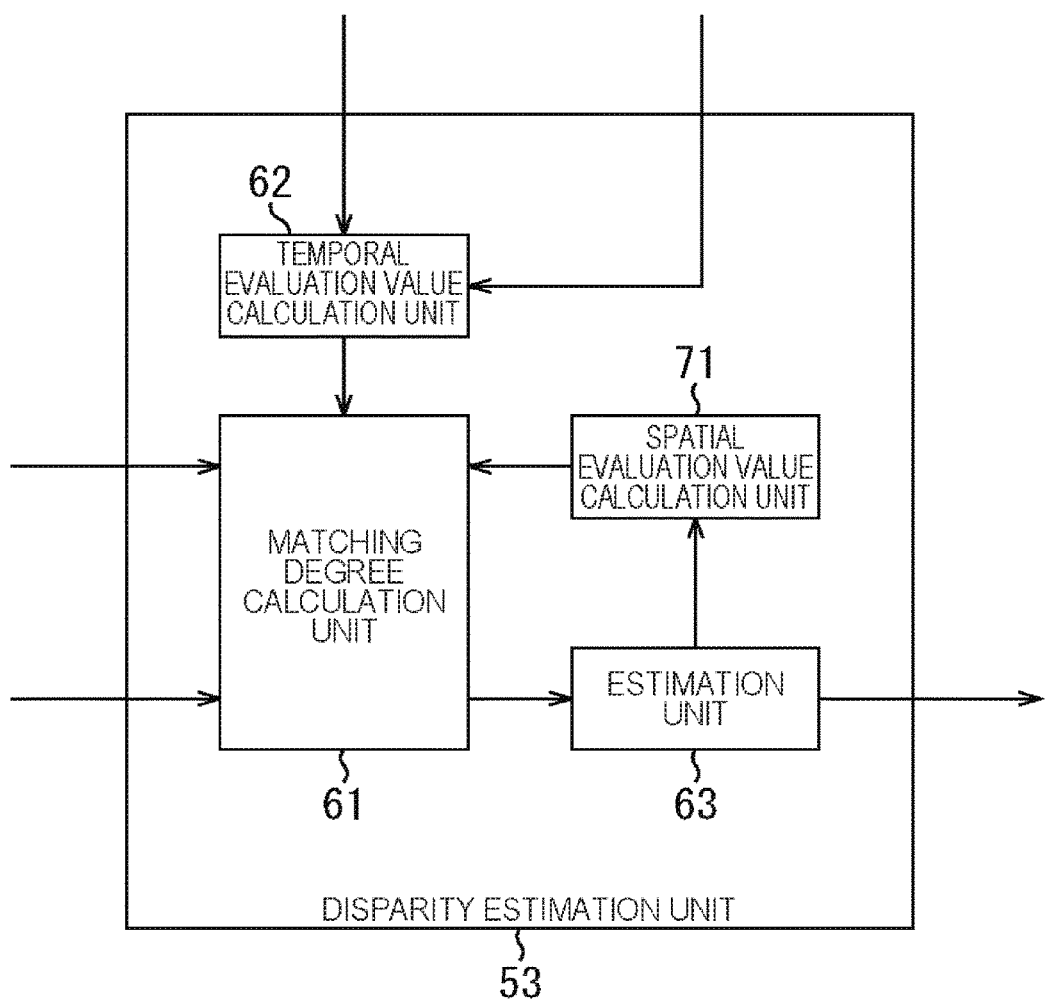
FIG. 9 is a block diagram illustrating another exemplary functional configuration of the disparity estimation unit.

FIG. 9 is a block diagram illustrating another exemplary configuration of the disparity estimation unit 53.

In the disparity estimation unit 53 of FIG. 9, structural elements that have a substantially similar function to that provided in the disparity estimation unit 53 of FIG. 7 are denoted with the same names and reference numerals, and repeated description thereof is omitted.

In other words, the disparity estimation unit 53 of FIG. 9 is different from the disparity estimation unit 53 of FIG. 7 in that a spatial evaluation value calculation unit 71 is provided.

The spatial evaluation value calculation unit 71 calculates a spatial evaluation value for evaluating a spatial variation in disparity using a disparity (disparity value) estimated previously for a neighboring pixel that is a pixel located near a target pixel by the estimation unit 63. The spatial evaluation value calculation unit 71 then supplies the calculated spatial evaluation value to the matching degree calculation unit 61.

The matching degree calculation unit 61 of FIG. 9 calculates the matching degree between a target pixel of a standard image and a corresponding pixel of a reference image using the temporal evaluation value supplied from the temporal evaluation value calculation unit 62 and the spatial evaluation value supplied from the spatial evaluation value calculation unit 71.

The disparity estimation process performed by the image processing device 12 including the disparity estimation unit 53 configured as described above is now described with reference to the flowchart of FIG. 10.

Figure 10:
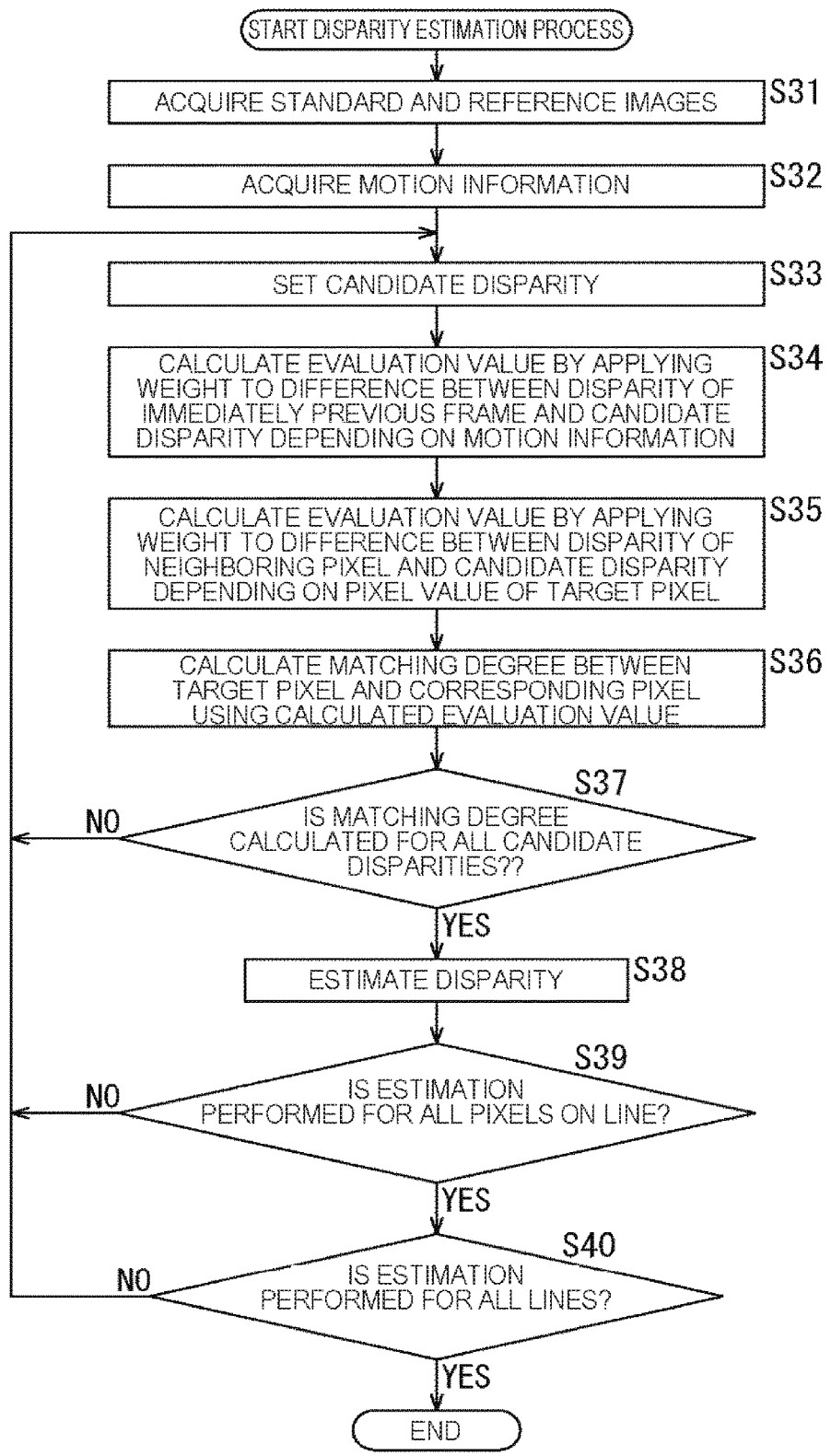
FIG. 10 is a flowchart illustrated to describe a disparity estimation process.

The process of steps S31 to S34 and S37 to S40 in the flowchart of FIG. 10 is substantially similar to the process of steps S11 to S14 and S16 to S19 in the flowchart of FIG. 8, and thus description thereof is omitted.

In step S35, the spatial evaluation value calculation unit 71 applies a weight to a disparity value $D_{neighbor}$ for a neighboring pixel located near a target pixel and the absolute value $|D_{neighbor}-d|$ of the difference between the disparity value and a candidate disparity d by a weighting factor $\lambda_{spatial}$ depending on a pixel value of the target pixel, and thus calculates a spatial evaluation value $\lambda_{spatial}|D_{neighbor}-d|$. For example when the pixel position of a target pixel in a standard image is $(x_L,y)$, the neighboring pixel is a pixel located at a position $(x_L-1,y)$ adjacent to the left side of the target pixel or a pixel located at a position $(x_L,y-1)$ adjacent to the upper side of the target pixel.

The absolute value $|D_{neighbor}-d|$ is a value that represents the continuity of disparity in the spatial direction. If it is assumed that the disparity value gradually varies on the same object, when a target pixel is located in a flat region on the same object, the absolute value $|D_{neighbor}-d|$ is small. On the other hand, when a target pixel is located in a boundary region between objects, the absolute value $|D_{neighbor}-d|$ is large.

Thus, the spatial evaluation value calculation unit 71 controls dynamically the weighting factor $\lambda_{spatial}$ by analyzing whether a target pixel is located in a flat region or in a boundary region based on a pixel value of the target pixel in an edge image corresponding to the standard image.

In other words, if it is determined that a pixel value of the target pixel in the edge image is smaller than a predetermined threshold and the target pixel is located in a flat region, then the spatial evaluation value calculation unit 71 increases the weighting factor $\lambda_{spatial}$, resulting in an increase in the spatial evaluation value $\lambda_{spatial}|D_{neighbor}-d|$.

On the other hand, if it is determined that a pixel value of the target pixel in the edge image is greater than the predetermined threshold and the target pixel is located in a boundary region, then the spatial evaluation value calculation unit 71 decreases the weighting factor $\lambda_{spatial}$, resulting in a decrease in the spatial evaluation value $\lambda_{spatial}|D_{neighbor}-d|$.

Then, in step S36, the matching degree calculation unit 61 calculates the matching degree between a luminance value of a target pixel in a standard image and a luminance value of a corresponding pixel in a reference image. This calculation is performed using the temporal evaluation value calculated by the temporal evaluation value calculation unit 62 and the spatial evaluation value calculated by the spatial evaluation value calculation unit 71.

Specifically, the matching degree calculation unit 61 sets the sum of the stereo matching term, the temporal evaluation value $\lambda_{temporal}|D_{previous}-d|$, and the spatial evaluation value $\lambda_{spatial}|D_{neighbor}-d|$ as an evaluation formula E, as shown in the following Equation (5), and then calculates the matching degree between a luminance value of a target pixel in a standard image and a luminance value of a corresponding pixel in a reference image.

$$E = \sum_n \sum_m (|I_L(x_L+m, y+n) - I_R(x_L+m-d, y+n)|) + \quad (5)$$

$$\lambda_{temporal}|D_{previous}-d| + \lambda_{spatial}|D_{neighbor}-d|$$

As described above, when a target pixel is located in a flat region, the term of the spatial evaluation value $\lambda_{spatial}|D_{neighbor}-d|$ in Equation (5) is large, and thus the effect on the evaluation formula E increases. As a result, it is possible to reduce a variation in the results obtained by the disparity estimation in the spatial direction. On the other hand, when a target pixel is located in a boundary region, the term of the spatial evaluation value $\lambda_{spatial}|D_{neighbor}-d|$ in Equation (5) is small, and thus the effect on the evaluation formula E decreases. As a result, the results obtained by the disparity estimation in the spatial direction are allowed to be varied.

According to the above-described process, the continuity in the spatial direction is considered by using a spatial evaluation value in addition to the continuity of disparity in the time direction in calculating the matching degree between corresponding points of the left and right images, and thus it is possible to estimate the disparity in a more reliable manner.

For example, in a region in which light is reflected on a surgical instrument or the like (hereinafter, referred to as "specular reflection region") in an image of a surgical scene obtained in an endoscope system provided with a twin-lens camera, the luminance value is large and the standard and reference images have low correlation. Thus, the stereo matching is not performed correctly and the result of disparity estimation may be erroneous.

In this regard, the weighting factor $\lambda_{spatial}$ may be controlled dynamically by analyzing whether a target pixel is located in a specular reflection region.

Specifically, if it is determined that the luminance value of a target pixel is greater than a predetermined threshold and a target pixel is located in a specular reflection region, then the weighting factor $\lambda_{spatial}$ is set to be large. If it is determined that the luminance value of a target pixel is smaller than the predetermined threshold and a target pixel is not located in a specular reflection region, then the weighting factor $\lambda_{spatial}$ is set to be small.

Thus, in the specular reflection region, the disparity value is not varied significantly from a disparity value estimated for a region near the specular reflection region and it is possible to estimate the disparity reliably.

In addition, even in a region with no depth in an image, that is, a region with no texture, the stereo matching may not be performed correctly and the result of disparity estimation may be erroneous. The following description is given of the configuration in which the disparity is estimated reliably even in a region with no depth.

(Reliable Disparity Estimation in Consideration of Depth)

Figure 11:
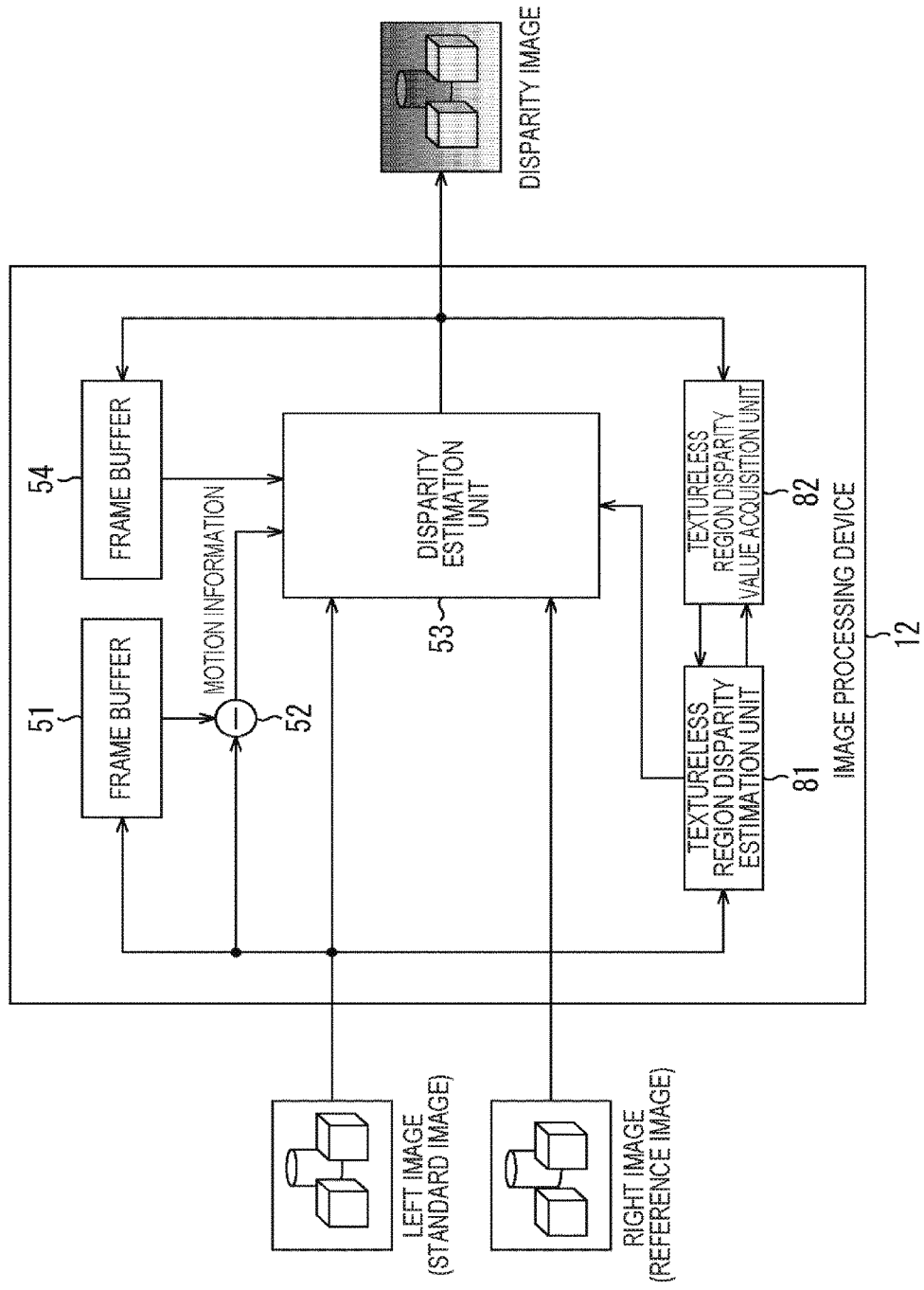
FIG. 11 is a block diagram illustrating another exemplary functional configuration of the image processing device.

FIG. 11 is a block diagram illustrating another exemplary configuration of the image processing device 12.

In the image processing device 12 of FIG. 11, structural elements that have a substantially similar function to that provided in the image processing device 12 of FIG. 6 are denoted with the same names and reference numerals, and repeated description of these structural elements is omitted.

In other words, the image processing device 12 of FIG. 11 is different from the image processing device 12 of FIG. 6 in that a textureless region disparity estimation unit 81 and a textureless region disparity value acquisition unit 82 are provided.

The textureless region disparity estimation unit 81 detects a region having no texture (a textureless region) by performing texture analysis on a standard image of the current frame, estimates a disparity for the textureless region, and supplies the estimated result to the disparity estimation unit 53.

Specifically, the textureless region disparity estimation unit 81 obtains luminance-disparity characteristics from the relationship between a luminance value and disparity value in a texture-less region of the previous frame and converts the luminance value in a textureless region of a standard image of the current frame to the disparity value, and thus estimates the disparity for the textureless region. A technique that performs disparity estimation by converting luminance values to disparity values is referred to as a disparity from luminance (DfL) disparity estimation method, and a disparity value obtained using the DfL disparity estimation method is hereinafter referred to as DfL disparity (a DfL disparity value).

The textureless region disparity value acquisition unit 82 obtains a disparity value for the textureless region detected by the textureless region disparity estimation unit 81 based on the disparity image outputted from the disparity estimation unit 53 and supplies the obtained disparity value to the textureless region disparity estimation unit 81.

Figure 12:
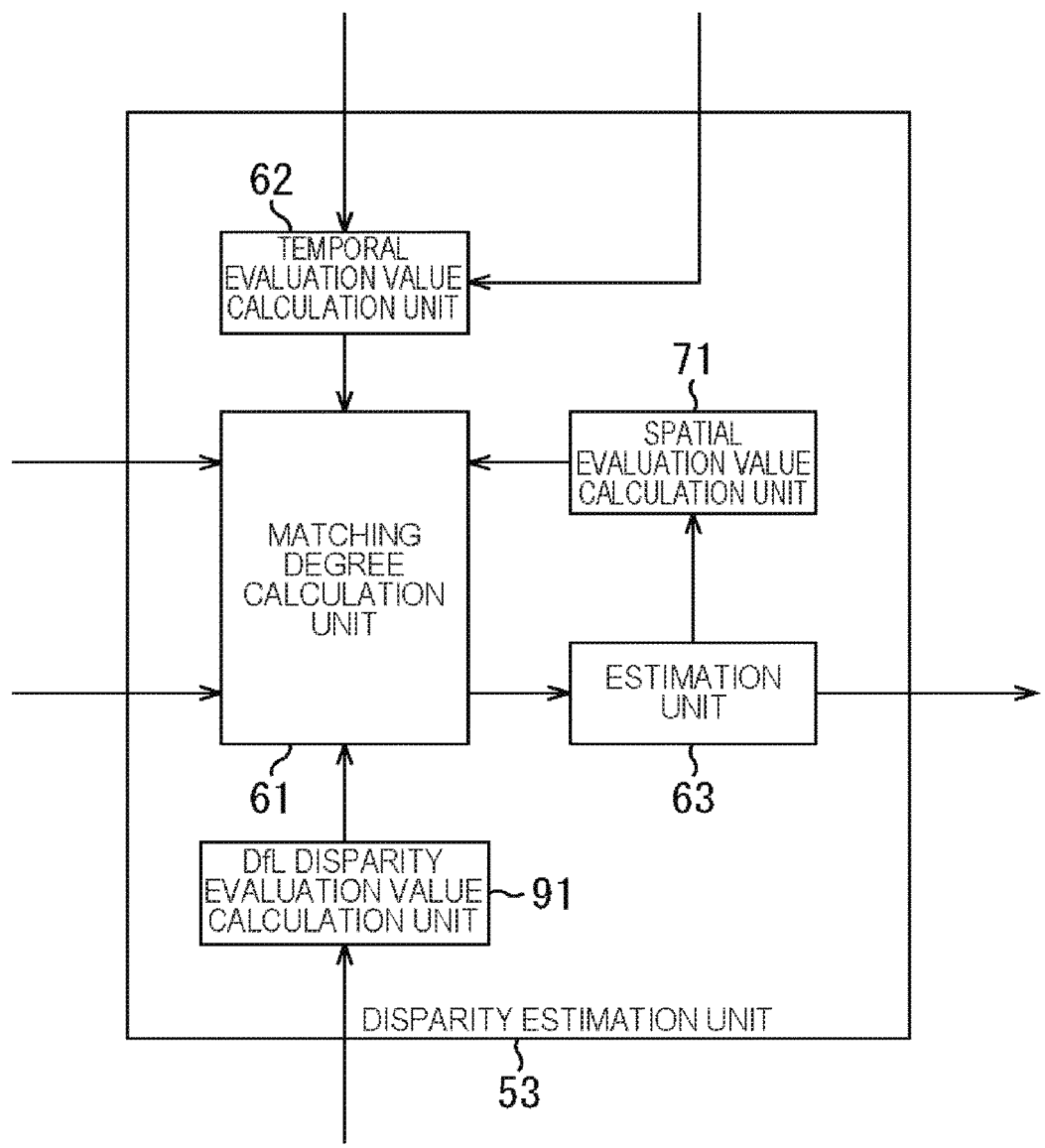
FIG. 12 is a block diagram illustrating still another exemplary functional configuration of the disparity estimation unit.

FIG. 12 is a block diagram illustrating an exemplary configuration of the disparity estimation unit 53 in the image processing device 12 of FIG. 11.

In the disparity estimation unit 53 of FIG. 12, structural elements that have a substantially similar function to that provided in the disparity estimation unit 53 of FIG. 9 are denoted with the same names and reference numerals, and repeated description of these structural elements is omitted.

In other words, the disparity estimation unit 53 of FIG. 12 is different from the disparity estimation unit 53 of FIG. 9 in that a DfL disparity evaluation value calculation unit 91 is provided.

The DfL disparity evaluation value calculation unit 91 calculates a DfL disparity evaluation value used to evaluate a DfL disparity value obtained by the textureless region disparity estimation unit 81 and supplies the calculated DfL disparity evaluation value to the matching degree calculation unit 61.

A disparity estimation process performed by the image processing device 12 configured as described above is now described with reference to the flowchart illustrated in FIG. 13.

The process of steps S51 to S55 and S58 to S61 in the flowchart of FIG. 13 is substantially similar to the process of steps S31 to S35 and S37 to S40 in the flowchart of FIG. 10, and thus description thereof is omitted.

In step S56, the DfL disparity evaluation value calculation unit 91 applies a weight to a DfL disparity value $D_{DfL}$ obtained for a target pixel and the absolute value $|D_{DfL}-d|$ of the difference between the DfL disparity value $D_{DfL}$ and a candidate disparity d by a weighting factor $\lambda_{DfL}$ depending on the reliability of luminance-to-disparity conversion (DfL disparity estimation) performed by the textureless region disparity estimation unit 81, and thus calculates a DfL disparity evaluation value $\lambda_{DfL}|D_{DfL}-d|$.

The absolute value $|D_{DfL}-d|$ is a value that represents a degree of match between the DfL disparity value obtained by performing DfL disparity estimation and the disparity value estimated by stereo matching. As the two disparity values approach to each other, the absolute value $|D_{DfL}-d|$ becomes small.

The DfL disparity evaluation value calculation unit 91 controls dynamically the weighting factor $\lambda_{DfL}$ based on the reliability of DfL disparity estimation performed by the textureless region disparity estimation unit 81.

In other words, if the reliability of DfL disparity estimation performed by the textureless region disparity estimation unit 81 is determined to be high, then the DfL disparity evaluation value calculation unit 91 increases the weighting factor $\lambda_{DfL}$, resulting in an increase in the DfL disparity evaluation value $\lambda_{DfL}|D_{DfL}-d|$.

On the other hand, if the reliability of DfL disparity estimation performed by the textureless region disparity estimation unit 81 is determined to be low, then the DfL disparity evaluation value calculation unit 91 decreases the weighting factor $\lambda_{DfL}$, resulting in a decrease in the DfL disparity evaluation value $\lambda_{DfL}|D_{DfL}-d|$.

Note that, when no target pixel is located in a textureless region, the weighting factor $\lambda_{DfL}$, is equal to zero.

In step S57, the matching degree calculation unit 61 calculates the matching degree between a luminance value of a target pixel in a standard image and a luminance value of a corresponding pixel in a reference image. This calculation is performed using the temporal evaluation value calculated by the temporal evaluation value calculation unit 62, the spatial evaluation value calculated by the spatial evaluation value calculation unit 71, and the DfL disparity evaluation value calculated by the DfL disparity evaluation value calculation unit 91.

Specifically, the matching degree calculation unit 61 sets the sum of the stereo matching term, the temporal evaluation value $\lambda_{temporal}|D_{previous}-d|$, the spatial evaluation value $\lambda_{spatial}|D_{neighbor}-d|$, and the DfL disparity evaluation value $\lambda_{DfL}|D_{DfL}-d|$ as an evaluation formula E, as shown in the following Equation (6), and then calculates the matching degree between a luminance value of a target pixel in a standard image and a luminance value of a corresponding pixel in a reference image.

$$E = \sum_n \sum_m (|I_L(x_L + m, y + n) - I_R(x_L + m - d, y + n)|) + \quad (6)$$

$$\lambda_{temporal}|D_{previous} - d| + \lambda_{spatial}|D_{neighbor} - d| + \lambda_{DfL}|D_{DfL} - d|$$

As described above, when the reliability of DfL disparity estimation is high, the term of the DfL disparity evaluation value $\lambda_{DfL}|D_{DfL}-d|$ in Equation (6) is large, and thus the effect on the evaluation formula E increases. As a result, it is possible to reduce a variation in the results obtained by the disparity estimation in the textureless region. On the other hand, when the reliability of DfL disparity estimation is low, the term of the DfL disparity evaluation value $l_{DfL}|D_{DfL}-d|$ in Equation (6) is small, and thus the effect on the evaluation formula E decreases. As a result, the results obtained by the disparity estimation in the textureless region are allowed to be varied.

According to the above-described process, the presence or absence of depth is considered using a DfL disparity evaluation value in addition to the continuity of disparity in the time direction and the continuity of disparity in the spatial direction in calculating the matching degree between corresponding points of the left and right images, and thus it is possible to estimate the disparity in a more reliable manner.

The techniques of disparity estimation according to an embodiment of the present technology described above may be used in combination with disparity estimation methods using dynamic programming as described in JP 2012-065851A and the like or other optimization techniques.

The above-described series of process steps may be implemented in hardware, software, or a combination of both. When the series of process steps are implemented in software, programs that constitute such software are installed into a computer. Examples of the computer include a computer incorporated into dedicated hardware and a general-purpose personal computer or the like that is capable of executing various functions by installation of various programs.

FIG. 14 is a block diagram illustrating an exemplary hardware configuration of a computer that executes the above-described series of process steps according to a program.

In the computer, a central processing unit (CPU) 901, a read only memory (ROM) 902, and a random access memory (RAM) 903 are connected to each other via a bus 904.

The bus 904 is also connected to an input/output interface 905. The input/output interface 905 is connected to an input unit 906, an output unit 907, a storage unit 908, a communication unit 909, and a drive 910.

The input unit 906 includes keyboards, mice, microphones, or any other input devices. The output unit 907 includes displays, speakers, or any other output devices. The storage unit 908 includes hard disk, non-volatile memory, or the like. The communication unit 909 includes network interfaces or the like. The drive 910 drives a removable medium 911 including magnetic disks, optical disks, magneto-optical disks, semiconductor memory or the like.

In the computer configured as described above, the CPU 901 loads a program that is stored, for example, in the storage unit 908 onto the RAM 903 via the input/output interface 905 and the bus 904, and executes the program. Thus, the above-described series of process steps are performed.

The program to be executed by the computer (CPU 901) may be provided while being recorded on the removable medium 911 in the form of a packaged medium or the like. The program may be provided via wired or wireless transmission media, such as a local area network, the Internet, or digital satellite broadcasting.

The computer may allow the program to be installed in the storage unit 908 via the input/output interface 905 by inserting the removable medium 911 into the drive 910. Further, the program may be received by the communication unit 909 via wired or wireless transmission media, and may be installed in the storage unit 908. Moreover, the program may be installed previously in the ROM 902 or the storage unit 908.

The program executed by a computer may be a program that is processed in time series according to the sequence described in this specification or a program that is processed in parallel or at necessary timing such as upon calling.

An embodiment of the present technology is not limited to the embodiments described above, and various changes and modifications may be made without departing from the scope of the present technology.

For example, the present technology may be embodied in cloud computing structure in which one function is shared among devices via a network, and processing is performed by the devices cooperating with one another.

The respective steps described with reference to the above-described flowchart may be carried out by one device or can be shared among devices.

In a case where multiple processes are included in one step, the processes included in the step may be performed by a single device or can be shared among devices.

Additionally, the present technology may also be configured as below.

(1) An Image Processing Device Including:
   a matching degree calculation unit configured to calculate a matching degree between a pixel value of a target pixel in a standard image of a current frame and a pixel value of a corresponding pixel in a reference image of the current frame; and
   an estimation unit configured to estimate a disparity between the standard image and the reference image based on a result obtained by calculating the matching degree,
   wherein the matching degree calculation unit calculates the matching degree using a disparity estimated for the standard image and the reference image of a previous frame.

(2) The Image Processing Device According to (1), Further Including:
   a temporal evaluation value calculation unit configured to calculate a temporal evaluation value used to evaluate a temporal variation in a disparity based on a difference between the disparity for the previous frame and the disparity estimated for the standard image and the reference image of the current frame,
   wherein the matching degree calculation unit calculates the matching degree using the temporal evaluation value.

(3) The image processing device according to (2), wherein the temporal evaluation value calculation unit applies a weight to the temporal evaluation value depending on a movement in the standard image or the reference image.

(4) The image processing device according to (3), wherein the temporal evaluation value calculation unit sets the weight to be applied to the temporal evaluation value to be larger as a movement in the standard image or the reference image becomes smaller.

(5) The image processing device according to any one of (1) to (4), wherein the matching degree calculation unit calculates the matching degree, using a pixel value of a pixel of a target region including the target pixel in the standard image of the current frame and a pixel value of a pixel of a corresponding region including the corresponding pixel in the reference image of the current frame.

(6) The image processing device according to any one of (2) to (5), further including:

a spatial evaluation value calculation unit configured to calculate a spatial evaluation value used to evaluate a spatial variation in a disparity based on a difference between a disparity estimated for a neighboring pixel located near the target pixel and a disparity estimated for the target pixel, wherein the matching degree calculation unit calculates the matching degree using the temporal evaluation value and the spatial evaluation value.

(7) The image processing device according to (6), wherein the spatial evaluation value calculation unit applies a weight to the spatial evaluation value depending on a pixel value of the target pixel.

(8) The image processing device according to any one of (2) to (7), further including:

a luminance-to-disparity conversion unit configured to convert luminance to a disparity based on a luminance value and a disparity for the previous frame, the luminance being a luminance value of a textureless region in the standard image of the current frame; and a luminance-disparity evaluation value calculation unit configured to calculate a luminance-disparity evaluation value used to evaluate a disparity converted from luminance based on a difference between the disparity converted from luminance of the standard image and the disparity estimated for the standard image of the current frame, wherein the matching degree calculation unit calculates the matching degree using the temporal evaluation value and the luminance-disparity evaluation value.

(9) The image processing device according to (8), wherein the luminance-disparity evaluation value calculation unit applies a weight to the luminance-disparity evaluation value depending on reliability of luminance-to-disparity conversion performed by the luminance-to-disparity conversion unit.

(10) The image processing device according to (9), wherein the luminance-disparity evaluation value calculation unit sets the weight to be applied to the luminance-disparity evaluation value to be larger as the reliability of luminance-to-disparity conversion performed by the luminance-to-disparity conversion unit becomes higher.

(11) An image processing method including:

calculating a matching degree between a pixel value of a target pixel in a standard image of a current frame and a pixel value of a corresponding pixel in a reference image of the current frame; and estimating a disparity between the standard image and the reference image based on a result obtained by calculating the matching degree, wherein the matching degree is calculated, in the matching degree calculating step, using a disparity estimated for the standard image and the reference image of a previous frame.

(12) A program for causing a computer to execute processing of:

calculating a matching degree between a pixel value of a target pixel in a standard image of a current frame and a pixel value of a corresponding pixel in a reference image of a current frame; and estimating a disparity between the standard image and the reference image based on a result obtained by calculating the matching degree, wherein the matching degree is calculated, in the matching degree calculating step, using a disparity estimated for the standard image and the reference image of a previous frame.

What is claimed is:

1. An image processing device comprising:
   circuitry configured to
   calculate a matching degree between a pixel value of a target pixel in a standard image of a current frame and a pixel value of a corresponding pixel in a reference image of the current frame;
   estimate a disparity between the standard image and the reference image based on a result obtained by calculating the matching degree; and
   calculate a spatial evaluation value used to evaluate a spatial variation in a disparity based on a difference between a disparity estimated for a neighboring pixel located near the target pixel and a disparity estimated for the target pixel, wherein
   the circuitry calculates the matching degree using the spatial evaluation value and a disparity estimated for the standard image and the reference image of a previous frame.

2. The image processing device according to claim 1, wherein the circuitry applies a weight to the temporal evaluation value depending on a movement in the standard image or the reference image.

3. The image processing device according to claim 2, wherein the circuitry sets the weight to be applied to the temporal evaluation value to be larger as a movement in the standard image or the reference image becomes smaller.

4. The image processing device according to claim 1, wherein the circuitry calculates the matching degree, using a pixel value of a pixel of a target region including the target pixel in the standard image of the current frame and a pixel value of a pixel of a corresponding region including the corresponding pixel in the reference image of the current frame.

5. The image processing device according to claim 1, wherein the circuitry applies a weight to the spatial evaluation value depending on a pixel value of the target pixel.

6. The image processing device according to claim 1, wherein
   the circuitry converts luminance to a disparity based on a luminance value and a disparity for the previous frame, the luminance being a luminance value of a textureless region in the standard image of the current frame,
   the circuitry calculates a luminance-disparity evaluation value used to evaluate a disparity converted from luminance based on a difference between the disparity converted from luminance of the standard image and the disparity estimated for the standard image of the current frame, and
   the circuitry calculates the matching degree using the luminance-disparity evaluation value.

7. The image processing device according to claim 6, wherein the circuitry applies a weight to the luminance-disparity evaluation value depending on reliability of luminance-to-disparity conversion performed by the circuitry.

8. The image processing device according to claim 7, wherein the circuitry sets the weight to be applied to the luminance-disparity evaluation value to be larger as the reliability of luminance-to-disparity conversion performed by the circuitry becomes higher.

9. An image processing method comprising:
calculating, using circuitry, a matching degree between a pixel value of a target pixel in a standard image of a current frame and a pixel value of a corresponding pixel in a reference image of the current frame;
estimating a disparity between the standard image and the reference image based on a result obtained by calculating the matching degree, wherein the matching degree is calculated, in the calculating of the matching degree calculating, using a disparity estimated for the standard image and the reference image of a previous frame, and the method further comprising calculating a temporal evaluation value used to evaluate a temporal variation in a disparity based on a difference between the disparity for the previous frame and the disparity estimated for the standard image and the reference image of the current frame, and calculating the matching degree using the temporal evaluation value; and
calculating a spatial evaluation value used to evaluate a spatial variation in a disparity based on a difference between a disparity estimated for a neighboring pixel located near the target pixel and a disparity estimated for the target pixel, wherein
the matching degree is calculated using the spatial evaluation value and a disparity estimated for the standard image and the reference image of a previous frame.

10. A non-transitory computer readable medium including executable instructions, which when executed by a computer cause the computer to execute an image processing method, the method comprising:
calculating a matching degree between a pixel value of a target pixel in a standard image of a current frame and a pixel value of a corresponding pixel in a reference image of the current frame;
estimating a disparity between the standard image and the reference image based on a result obtained by calculating the matching degree, wherein the matching degree is calculated, in the calculating of the matching degree calculating, using a disparity estimated for the standard image and the reference image of a previous frame, and the method further comprising calculating a temporal evaluation value used to evaluate a temporal variation in a disparity based on a difference between the disparity for the previous frame and the disparity estimated for the standard image and the reference image of the current frame, and calculating the matching degree using the temporal evaluation value; and
calculating a spatial evaluation value used to evaluate a spatial variation in a disparity based on a difference between a disparity estimated for a neighboring pixel located near the target pixel and a disparity estimated for the target pixel, wherein
the matching degree is calculated using the spatial evaluation value and a disparity estimated for the standard image and the reference image of a previous frame.

* * * * *